(12) United States Patent
Niggemann et al.

(10) Patent No.: US 10,730,563 B2
(45) Date of Patent: Aug. 4, 2020

(54) REINFORCING DEVICE FOR REINFORCING A STRUCTURAL ELEMENT IN A MOTOR VEHICLE

(71) Applicant: SIKA TECHNOLOGY AG, Baar (CH)

(72) Inventors: Stephan Niggemann, Widen (CH); Nicolas Brichet, Zürich (CH); Roman Schneuwly, Berikon (CH)

(73) Assignee: SIKA TECHNOLOGY AG, Baar (CH)

( * ) Notice: Subject to any disclaimer, the term of this patent is extended or adjusted under 35 U.S.C. 154(b) by 18 days.

(21) Appl. No.: 16/140,103

(22) Filed: Sep. 24, 2018

(65) Prior Publication Data

US 2019/0106157 A1  Apr. 11, 2019

(30) Foreign Application Priority Data

Oct. 6, 2017  (EP) .................................... 17195294

(51) Int. Cl.
| | |
|---|---|
| *B62D 25/08* | (2006.01) |
| *B62D 21/03* | (2006.01) |
| *B62D 25/20* | (2006.01) |
| *B62D 29/00* | (2006.01) |
| *B62D 25/00* | (2006.01) |
| *B62D 65/06* | (2006.01) |

(52) U.S. Cl.
CPC ............. *B62D 25/08* (2013.01); *B62D 21/03* (2013.01); *B62D 25/00* (2013.01); *B62D 25/2036* (2013.01); *B62D 29/002* (2013.01); *B62D 29/005* (2013.01); *B62D 65/06* (2013.01)

(58) Field of Classification Search
CPC ...... B62D 25/08; B62D 25/00; B62D 29/002; B62D 29/005; B62D 25/2036; B62D 21/03; B62D 65/06
USPC ....................................................... 296/146.6
See application file for complete search history.

(56) References Cited

U.S. PATENT DOCUMENTS

| | | | |
|---|---|---|---|
| 6,247,287 B1 * | 6/2001 | Takabatake ............. | B29C 44/18 264/46.6 |
| 6,607,238 B2 * | 8/2003 | Barz ...................... | B62D 21/15 296/187.09 |

(Continued)

FOREIGN PATENT DOCUMENTS

| | | |
|---|---|---|
| DE | 10 2005 043 698 A1 | 3/2007 |
| DE | 10 2014 203 722 A1 | 9/2014 |

(Continued)

OTHER PUBLICATIONS

Apr. 9, 2018 Search Report and Written Opinion issued in European Patent Application No. 17195294.8.

*Primary Examiner* — Pinel E Romain
(74) *Attorney, Agent, or Firm* — Oliff PLC

(57) ABSTRACT

A reinforcing device for reinforcing a structural element in a motor vehicle includes a support, a reinforcing element and an adhesive. The support has a first surface for orientation towards a first wall of the structural element and a second surface for orientation towards a second wall of the structural element. The reinforcing element is designed for arrangement between the support and the first wall of the structural element. The adhesive is designed to connect the support to the reinforcing element and to connect the support and the reinforcing element to the structural element.

15 Claims, 5 Drawing Sheets

(56) References Cited

U.S. PATENT DOCUMENTS

| | | | |
|---|---|---|---|
| 7,105,112 B2* | 9/2006 | Czaplicki | B29C 44/18 |
| | | | 264/46.5 |
| 9,033,404 B2* | 5/2015 | Meaige | B62D 29/002 |
| | | | 296/193.06 |
| 9,162,707 B2* | 10/2015 | Eipper | B62D 25/04 |
| 2001/0039780 A1 | 11/2001 | Matsuki et al. | |

FOREIGN PATENT DOCUMENTS

| | | |
|---|---|---|
| JP | 2006-282099 A | 10/2006 |
| WO | 2008/077944 A1 | 7/2008 |
| WO | 2011/117398 A1 | 9/2011 |
| WO | 2011/117402 A1 | 9/2011 |
| WO | 2011/124924 A1 | 10/2011 |

\* cited by examiner

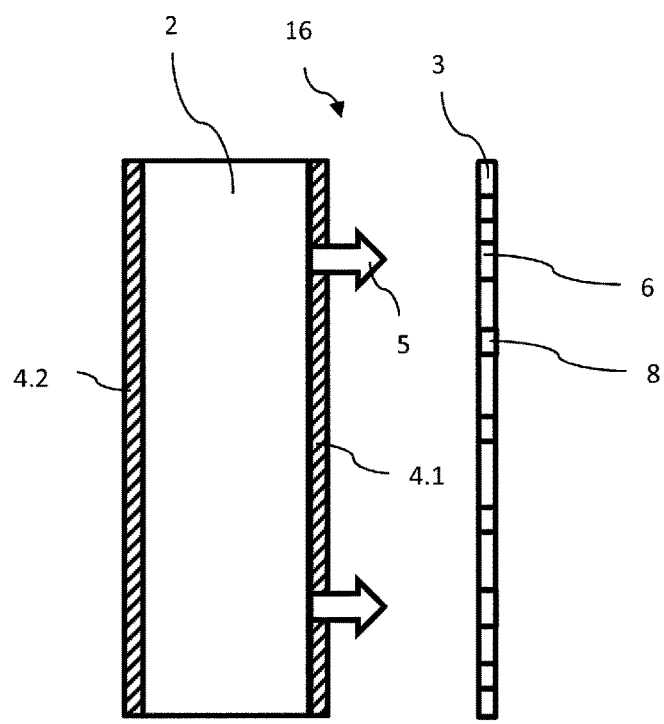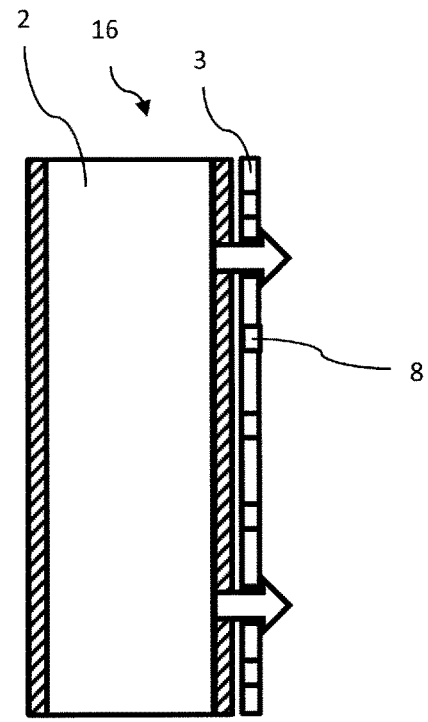
Fig. 4a  Fig. 4b
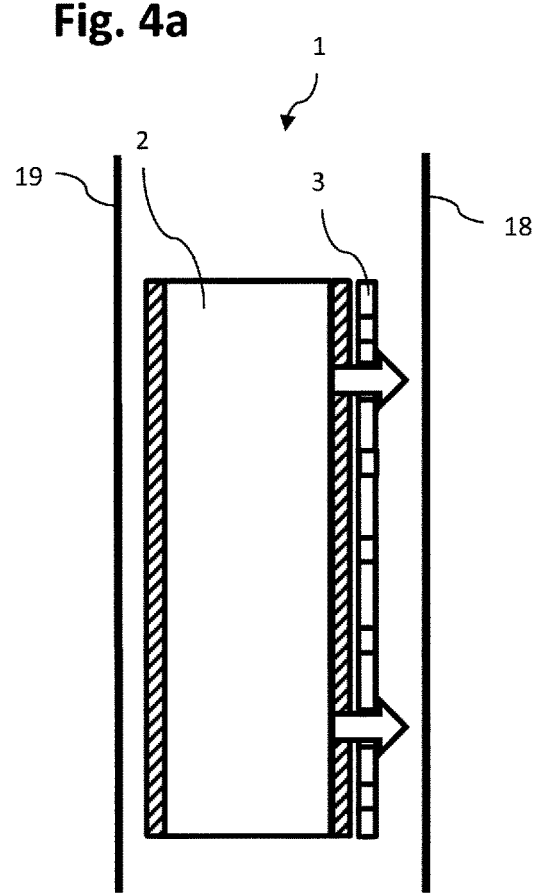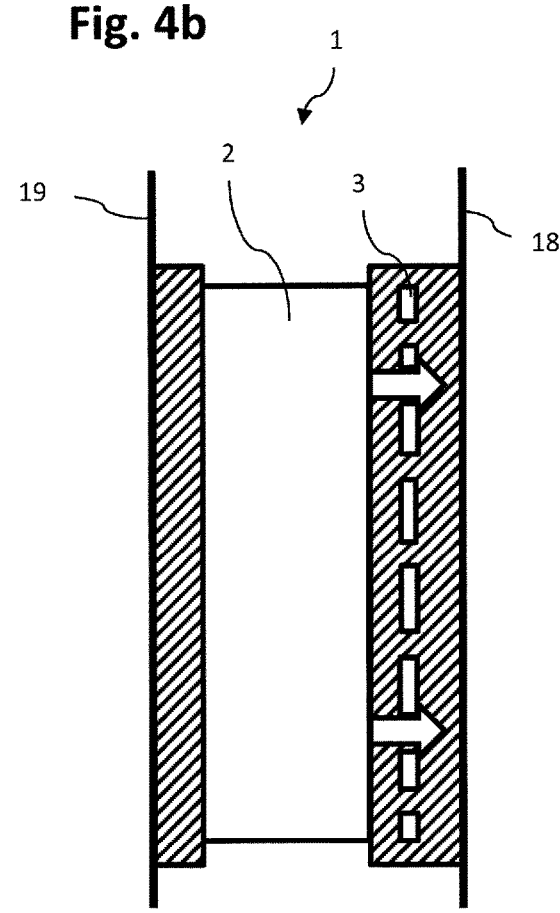
Fig. 4c  Fig. 4d

REINFORCING DEVICE FOR REINFORCING A STRUCTURAL ELEMENT IN A MOTOR VEHICLE

The invention relates to a reinforcing device for reinforcing a structural element in a motor vehicle, a system of a reinforced structural element of a motor vehicle, and a method for reinforcing a structural element in a motor vehicle.

In many cases, components, such as bodies and/or frames of means of transport, in particular of motor vehicles, have structures with cavities in order to permit lightweight constructions. In that context, it is often desirable to substantially strengthen these cavities and thus the component while retaining the low weight.

For this reason, use is made in particular in automotive engineering, but also in aeronautical and marine engineering, of reinforcing elements (also "reinforcers") for reinforcing cavities.

FIG. 1 shows, schematically, a body of a motor vehicle. In that context, the body 10 has various structures with cavities, such as the A-pillar 11, the B-pillar 12, the C-pillar 13 and the roof frame 14.

These and other cavities or structures in bodies of motor vehicles are usually reinforced with reinforcing elements which have a foamable adhesive for bonding the reinforcing element in the structural component. The drawback of such known solutions is that the reinforcing effect that can be achieved with such known solutions is not sufficient for regions with particularly high requirements with respect to a reinforced structure, such as regions of the A-pillar or of the roof frame. In particular for components which perform important functions in the event of very high loading, such as are experienced in accidents, the greatest possible mechanical reinforcing effect is desirable.

This invention therefore has the object of providing an improved system for reinforcing structural elements in motor vehicles which on the one hand still permits lightweight constructions and on the other hand satisfies very high demands in respect of mechanical reinforcement of the structural element.

This object is achieved first of all by a reinforcing device for reinforcing a structural element in a motor vehicle, wherein the reinforcing device comprises: a support having a first surface for orientation towards a first wall of the structural element and a second surface for orientation towards a second wall of the structural element; a reinforcing element for arrangement between the support and the first wall of the structural element; and an adhesive for connecting the support to the reinforcing element and for connecting the support and the reinforcing element to the structural element.

In a further aspect, the object stated at the outset is achieved by a system of a reinforced structural element in a motor vehicle, wherein the system comprises: a structural element having at least one first wall and one second wall; a reinforcing device arranged in the structural element, comprising: a support having a first surface and a second surface, wherein the first surface faces the first wall of the structural element and wherein the second surface faces the second wall of the structural element; a reinforcing element, which is arranged between the support and the first wall of the structural element; and an adhesive, which connects the support to the reinforcing element and which connects the support and the reinforcing element to the structural element.

In a further aspect, the object stated at the outset is furthermore achieved by a method for reinforcing a structural element in a motor vehicle, wherein the method comprises the following steps: supplying a support having a first surface and a second surface; supplying a reinforcing element; arranging the support and the reinforcing element in the structural element, such that the first surface faces a first wall of the structural element and the second surface faces a second wall of the structural element, and such that the reinforcing element is arranged between the support and the first wall of the structural element; and connecting the support to the reinforcing element and connecting the reinforcing element to the structural element with adhesive.

This solution has the advantage that it is thus possible to achieve markedly improved mechanical reinforcing properties than was the case with conventional reinforcing solutions, e.g. with supports without additional reinforcing elements or reinforcing elements without additional supports. Particularly in the region of nodes of a body of the kind which occur, for example, at the upper and lower ends of A-pillars, B-pillars or C-pillars, very high demands are made on mechanical properties. It is therefore important to be able to reinforce such critical points in bodies with particularly strong systems, thus enabling them to withstand the high loads in a load case of the kind which occurs, for example, in accidents.

A core concept of the present invention consists in that the reinforcing device proposed here, comprising a support and a reinforcing element which are connected to one another and to the structural element with an adhesive, combines the advantages of known solutions with just one support or just one reinforcing element in an ideal way. On the one hand, this markedly improves mechanical properties and, on the other hand, the solution proposed here allows simple and low-cost handling of this multi-part system.

In the context of this invention, the expression "first surface of the support" or "second surface of the support" means a functional surface unit of the support, e.g. one side of a cuboid, which can be perceived essentially as a unit. In this context, such a surface can be a continuous surface but also a non-continuous surface. For example, the surface can be composed of a plurality of smaller surfaces, in particular in the form of a chessboard pattern. Furthermore, the surface can lie in one plane or, alternatively, can be of uneven design.

In one exemplary embodiment, a first adhesive is arranged on the first surface of the support and/or on the reinforcing element.

In one exemplary embodiment, a second adhesive is arranged on the second surface of the support.

In one exemplary embodiment, a third adhesive is arranged on the reinforcing element.

Arranging adhesives on the support or on the reinforcing element has the advantage that this enables the adhesive to be introduced into the structural element together with the support and the reinforcing element. Thus, it is not necessary to introduce the adhesive separately into respective interspaces between the support and the reinforcing element and between the support and the structural element and between the reinforcing element and the structural element. This makes the system proposed here considerably easier to use.

In an alternative embodiment, the adhesive is introduced into the interspaces between the support, the reinforcing element and the structural element after the support and the reinforcing element have been arranged in the structural element.

In one exemplary embodiment, the support has a first connecting element, and the reinforcing element has a second connecting element, wherein the support and the reinforcing element can be connected to one another by the connecting elements.

In one exemplary refinement, the support and the reinforcing element can be connected to one another mechanically by the connecting elements.

For example, the first connecting element can be designed as a clip and the second connecting element can be designed as a mating part, thus enabling the support and the reinforcing element to be clipped to one another.

In one exemplary embodiment, the first connecting element is designed as a double clip, wherein a first clip can be connected to the second connecting element of the reinforcing element, and wherein a second clip can be connected to a wall of the structural element.

In this case, the reinforcing element and the wall of the structural element can each be embodied with a hole, through which the first clip and the second clip, respectively, can be passed and fastened.

This has the advantage that it enables one element to be used both to connect the support and the reinforcing element to one another and to connect the combination of the support and the reinforcing element to the structural element.

In one exemplary embodiment, both the support and the reinforcing element have a plurality of connecting elements, and therefore the support and the reinforcing element are configured in such a way that they can be connected to one another at several locations. In particular, both the support and the reinforcing element can have two, three, four, five or six connecting elements.

In an alternative embodiment, the support and the reinforcing element can be connected to one another magnetically by the connecting elements. In another alternative embodiment, the support and the reinforcing element can be connected to one another by the connecting elements using further adhesives.

The advantage of such connecting elements on the support and the reinforcing element consists in that it enables the support to be pre-fixed to the reinforcing element, thus allowing the support and the reinforcing element to be connected to one another first of all and then introduced jointly into the structural element. This considerably simplifies handling of the system proposed here. Moreover, it is thereby possible to ensure that the support and the reinforcing element are positioned relative to one another in the manner envisaged in the structural element.

In one exemplary embodiment, the support and/or the reinforcing element comprise/comprises one or more spacers.

In one exemplary refinement, the spacer is designed as a pin or as a projection or as a rod or as a boss.

The advantage of such spacers can be regarded as the fact that, once again, they enable a position of the support relative to the reinforcing element to be predefined.

In particular, connecting elements and spacers can be combined with one another in order to ensure pre-fixing of the support relative to the reinforcing element in a manner which is as simple to handle, inexpensive and reliable as possible.

In one exemplary embodiment, the reinforcing element has at least one aperture.

In one exemplary refinement, the at least one aperture makes up between 10% and 50% of a total area of the reinforcing element, particularly preferably between 15 and 45%, particularly preferably between 20 and 40%.

Providing such apertures in the reinforcing element has the advantage that it allows the adhesive to flow through these apertures. Thus, for example, an adhesive which is arranged between the support and the reinforcing element can both connect the support to the reinforcing element and the support and the reinforcing element to a wall of the structural element by virtue of a flowing movement and/or a spreading movement. Such apertures therefore also allow embodiments in which adhesive is arranged only on the support but not on the reinforcing element. A flowing movement through the apertures in the reinforcing element nevertheless ensures reliable adhesive bonding of the overall system.

In this case, it has been found that the apertures should take up approximately one third of the total area of the reinforcing element in order to achieve the best possible distribution of the adhesive and, at the same time, to avoid excessively diminishing mechanical properties of the reinforcing element.

In one exemplary embodiment, the reinforcing element comprises metal (particularly steel, aluminium or magnesium), plastic, fibre-reinforced plastic (particularly carbon-fibre-reinforced plastic or glass-fibre-reinforced plastic) or combinations thereof.

This has the advantage of making it possible to create lightweight reinforcing elements which satisfy the mechanical requirements for this application.

In one exemplary embodiment, the support is constructed at least in part of plastic, fibre-reinforced plastic, aluminium or magnesium.

In one exemplary embodiment, the support is constructed at least in part of glass-fibre-reinforced plastic or of carbon-fibre-reinforced plastic. In that context, it is for example possible to use endless fibres, short fibres or long fibres.

In one exemplary refinement, the support is constructed at least in part of polyamide, in particular of PA6 or of PA6.6.

In one exemplary embodiment, the reinforcing element has at least one tab for fastening the reinforcing element on the structural element. In one exemplary refinement, the at least one tab is designed as a welding tab. In one exemplary refinement, the at least one tab and the reinforcing element are made of metal, in particular of steel.

The provision of one or more such tabs has the advantage that the reinforcing element and the support fastened thereto can be pre-fixed in the structural element as long as the support and the reinforcing element are not connected to the structural element by the adhesive.

In one exemplary embodiment, the support has ribs for reinforcement.

The provision of such ribs on the support has the advantage that it is thereby possible to obtain supports which have the capacity to withstand higher mechanical loads while at the same time being lighter than would be the case with supports without ribs.

In one exemplary embodiment, the adhesive comprises a non-expandable adhesive.

In the context of this invention, the expression "non-expandable" refers to a behaviour of a material in which the volume of the material does not change by more than 10%. Thus, materials such as adhesives which expand or contract slightly on curing, for example, are also understood to be "non-expandable materials".

In the context of this invention, the "expansion rate" is understood to be the increase in volume, relative to the original volume, that takes place during expansion. Thus, an expansion rate of 100% implies a doubling of the volume during expansion.

As non-expandable adhesives, it is for example possible to use adhesives that are available under the trade name SikaPower®.

In an alternative embodiment, the adhesive comprises an expandable adhesive.

In one exemplary refinement, the adhesive has an expansion rate of less than 500%, preferably of less than 400%, particularly preferably of less than 300%.

As expandable adhesives, it is for example possible to use adhesives that are available under the trade name SikaReinforcer®.

In one alternative embodiment, the adhesive is a shape memory adhesive. Shape-memory adhesives, as described for example in documents WO 2011/117398 and WO 2011/117402, can for example be applied to the support and the reinforcing element and then forced into a stressed shape. In this stressed shape, the support and the reinforcing element with the adhesive are introduced into the cavity. The adhesive can be returned to its original shape by application of heat, and thus the adhesive closes a gap between the reinforcing device and the structural element.

The advantage of such shape-memory adhesives is that it produces a gap between the reinforcing device and the structural element, in order for example to coat the structural element, and that at the same time it is possible to achieve an adhesive bond with very good mechanical properties because it is not necessary to foam the shape-memory adhesive.

In another alternative embodiment, the adhesive is an injectable adhesive. A system with injectable adhesives is presented for example in document WO 2008/077944. In that context, the reinforcing device is first arranged in the structural element, and then the liquid adhesive is introduced into the interspace between the reinforcing device and the structural element.

This has the advantage of making it possible to achieve very good mechanical properties of the adhesive layer, once again because it is not necessary to foam the adhesive.

In another alternative refinement, the adhesive is an extruded adhesive. A system with an extruded adhesive of this kind is described for example in WO 2014/124924.

An advantage of extruded adhesives is in particular that it is not necessary to overcome a gap between the reinforcing device in the structural element, and that consequently no foaming, with the associated mechanical weakening, of the adhesive is necessary.

As extruded adhesive, it is for example possible to use adhesives that are available under the trade name SikaPower®.

In one exemplary embodiment, the adhesive comprises a curable adhesive.

The advantage of curable adhesives consists in that they enable systems with improved mechanical properties to be made available.

In one exemplary refinement, the first adhesive and the second adhesive are identical adhesives.

In one alternative refinement, the first adhesive and the second adhesive are different adhesives. For example, the first adhesive can have an expansion rate or a composition different to that of the second adhesive.

A third adhesive, where provided, can, in turn, be the same as or different from the first adhesive and the second adhesive.

In one exemplary embodiment, a length of the reinforcing element is between 50% and 200% of a length of the support, preferably between 70% and 150%, particularly preferably between 80% and 130%.

In one exemplary embodiment, a width of the reinforcing element is between 50% and 200% of a width of the support, preferably between 70% and 150%, particularly preferably between 80% and 130%.

It has been found that reinforcing elements which have approximately the same dimensions as the first or the second surface of the support are particularly suitable for implementing the reinforcing systems proposed here.

In one exemplary embodiment, the reinforcing device is arranged in a region of a node of a body of the motor vehicle. In particular, the reinforcing device is arranged in end regions of the A-pillar, C-pillar or D-pillar, and at corners of the body.

This is advantageous because, in this way, it is possible to reinforce regions of the body with the system proposed here which are subjected to particularly high loads, such as those which occur during accidents, for example.

Details and advantages of the invention are described in the following text on the basis of embodiment examples and with reference to schematic drawings, in which:

FIGS. 2a, 2b, 3a, 3b, 4a, 4b, 4c and 4d show an exemplary illustration of a reinforcing device or a system of a reinforced structural element.

Three different embodiments of a reinforcing device or a system of a reinforced structural element are illustrated in each of FIGS. 2 to 4. Here, the reinforcing device is in each case illustrated first, after which the system of a reinforced structural element, in which the reinforcing device is arranged in the structural element in the envisaged position thereof, is illustrated.

Figure 1:
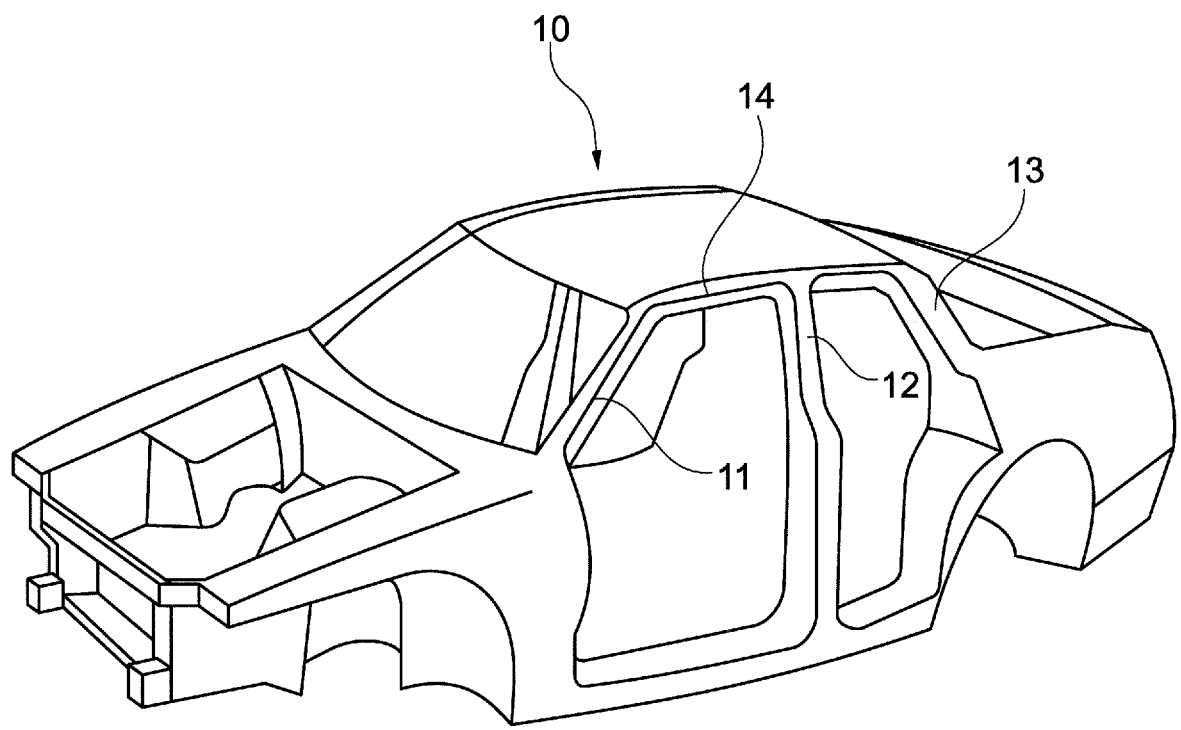
FIG. 1 shows an exemplary illustration of a body of a motor vehicle.
Figure 2A:
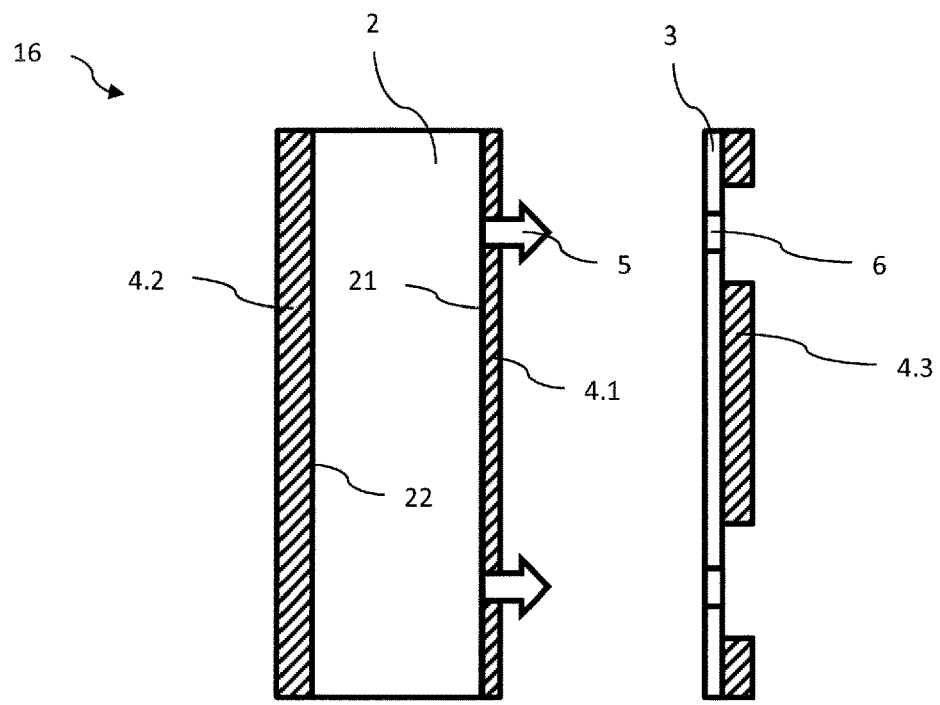
Figure 2B:
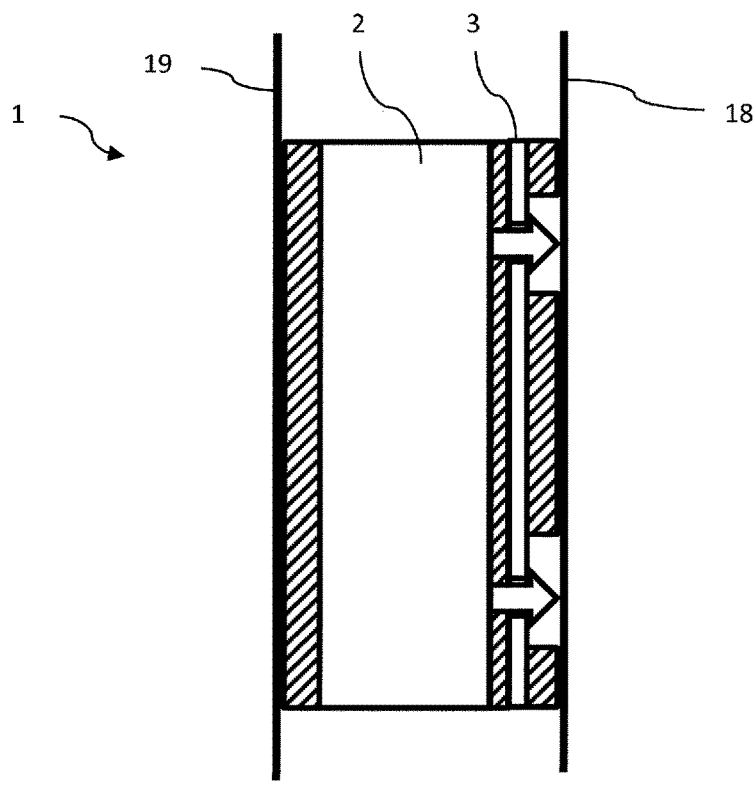

In the embodiment example shown in FIGS. 2a and 2b, the reinforcing device 16 comprises a support 2, a reinforcing element 3 and an adhesive 4. In this embodiment example, a first adhesive 4.1 is arranged on a first surface 21 of the support 2. A second adhesive 4.2 is arranged on a second surface 22 of the support 2. A third adhesive 4.3 is arranged on the reinforcing element 3. Here, the first adhesive 4.1, the second adhesive 4.2 and the third adhesive 4.3 can be identical but also different adhesives.

In this embodiment example, the support 2 has first connecting elements 5, and the reinforcing element 3 has second connecting elements 6. In this embodiment example, the first connecting elements 5 are designed as clips, and the second connecting elements 6 are designed as corresponding mating parts. As a result, the support 2 and the reinforcing element 3 can be pre-fixed before the support 2 and the reinforcing element 3 are introduced into the structural element. This considerably simplifies handling of the system.

A system 1 of a reinforced structural element is then illustrated in FIG. 2b, wherein the reinforcing device 16 illustrated in FIG. 2a is arranged between a first wall 18 of the structural element and a second wall 19 of the structural element.

In this embodiment example shown in FIGS. 2a and 2b, the adhesive 4 is designed as non-expandable adhesive. For example, the adhesive 4 can be designed as curable adhesive, thus enabling the reinforcing device 16 first of all to be pre-fixed and arranged in the structural element and then the adhesive 4 to be cured, e.g. by the application of heat, in order to connect the elements securely to one another.

Figure 3A:
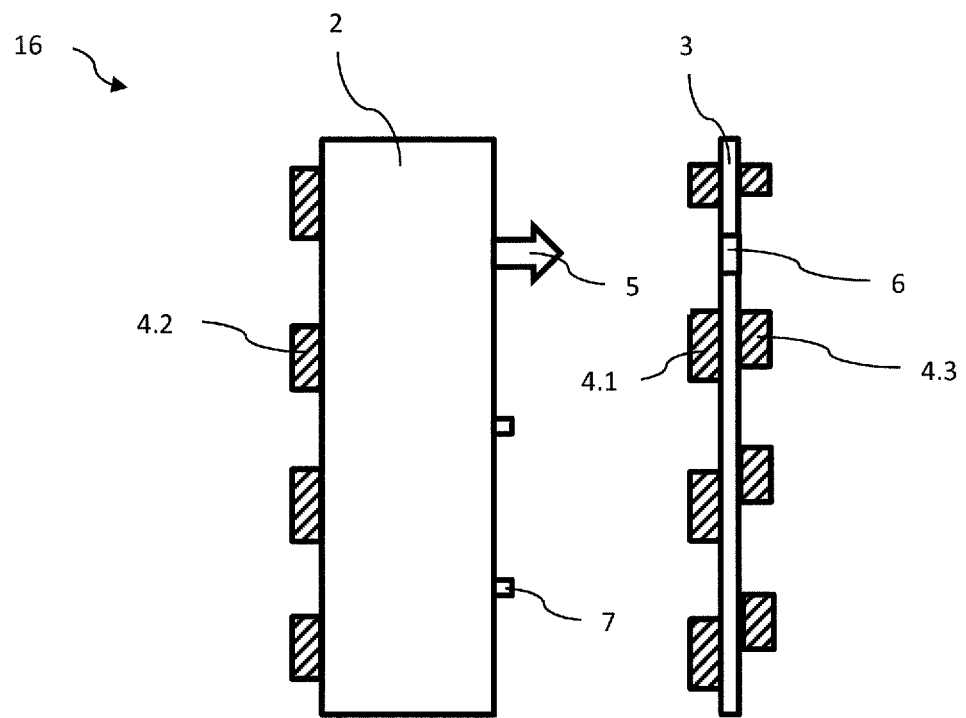
Figure 3B:
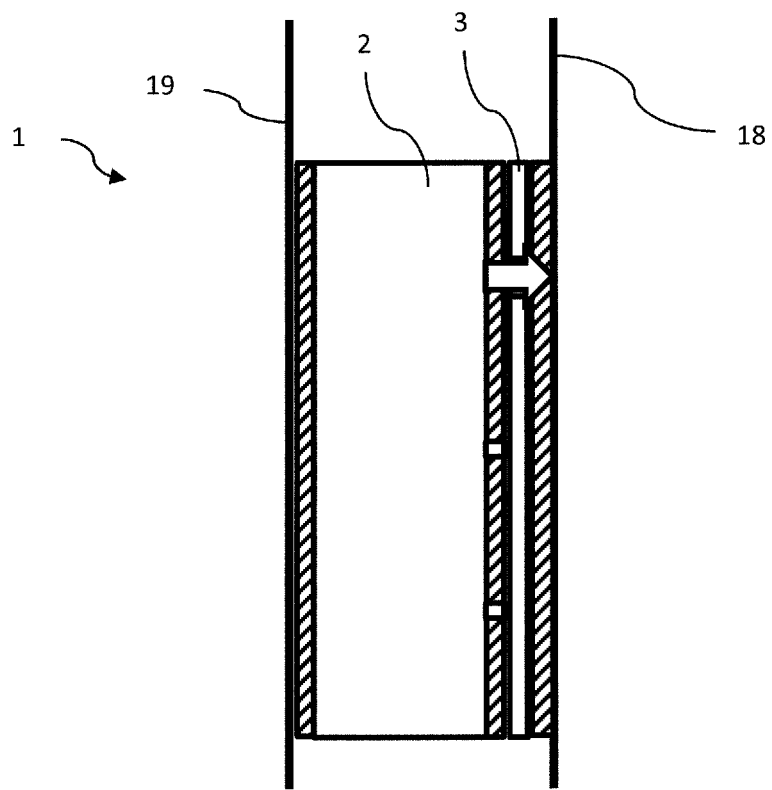

Another embodiment example of a reinforcing device 16 or of a system 1 of a reinforced structural element having a reinforcing device 16 of this kind is illustrated in FIGS. 3a and 3b. In this embodiment example, the adhesive 4 is not arranged extensively over the support 2 or on the reinforcing element 3 but is in the form of adhesive beads. During the assembly of the elements, these adhesive beads are deformed, resulting ultimately once again in extensive distribution of the adhesive 4 between the elements. In this embodiment example too, the adhesive 4 is designed as non-expandable adhesive.

In this embodiment example according to FIGS. 3a and 3b, the support 2 has two spacers 7 in addition to the first connecting element 5. As can be seen in FIG. 3b, these spacers 7 define a position of the reinforcing element 3 relative to the support 2.

Another embodiment example of a reinforcing device 16 or of a system 1 having a reinforcing device of this kind in a structural element is illustrated in FIGS. 4a to 4d. Here, FIG. 4a shows the support 2 and the reinforcing element 3 separately, FIG. 4b shows the support 2 with the reinforcing element 3 in a pre-fixed state, FIG. 4c shows a system 1 in which the pre-fixed reinforcing device 16 (comprising the support 2, the reinforcing element 3 and adhesive 4) is arranged in the structural element, and FIG. 4d shows a system 1 in which the reinforcing device 16 is connected by the adhesive 4 to the structural element or to the walls 18, 19 thereof.

In this embodiment example, no adhesive 4 is initially arranged on the reinforcing element 3. However, the reinforcing element 3 has apertures 8 through which the adhesive 4 can flow. In this embodiment example, the adhesive 4 is designed as an expandable adhesive. In FIGS. 4a to 4c, the adhesive is illustrated in a state before expansion and, in FIG. 4d, the adhesive is illustrated in a state after expansion. The expansion of the adhesive can be induced by the application of heat, for example. Illustrative adhesives that can be expanded by means of heat are available under the trade name SikaReinforcer®.

In this embodiment example, the reinforcing device 16 shown in FIG. 4b is accordingly introduced into the structural element first, before the adhesive 4 expands, as illustrated in FIG. 4c. After the positioning of the reinforcing device 16 in the structural element, the adhesive 4 is expanded, wherein the first adhesive 4.1, which was initially arranged on the first surface of the support 2, flows through the apertures 8 in the reinforcing element 3 and thereby both connects the support 2 to the reinforcing element 3 and the support 2 and the reinforcing element 3 to the structural element or the walls 18, 19 thereof. In this embodiment example according to FIGS. 4a to 4d, it is accordingly possible to use a reinforcing element 3 without adhesive 4 arranged thereon.

Figure 5:
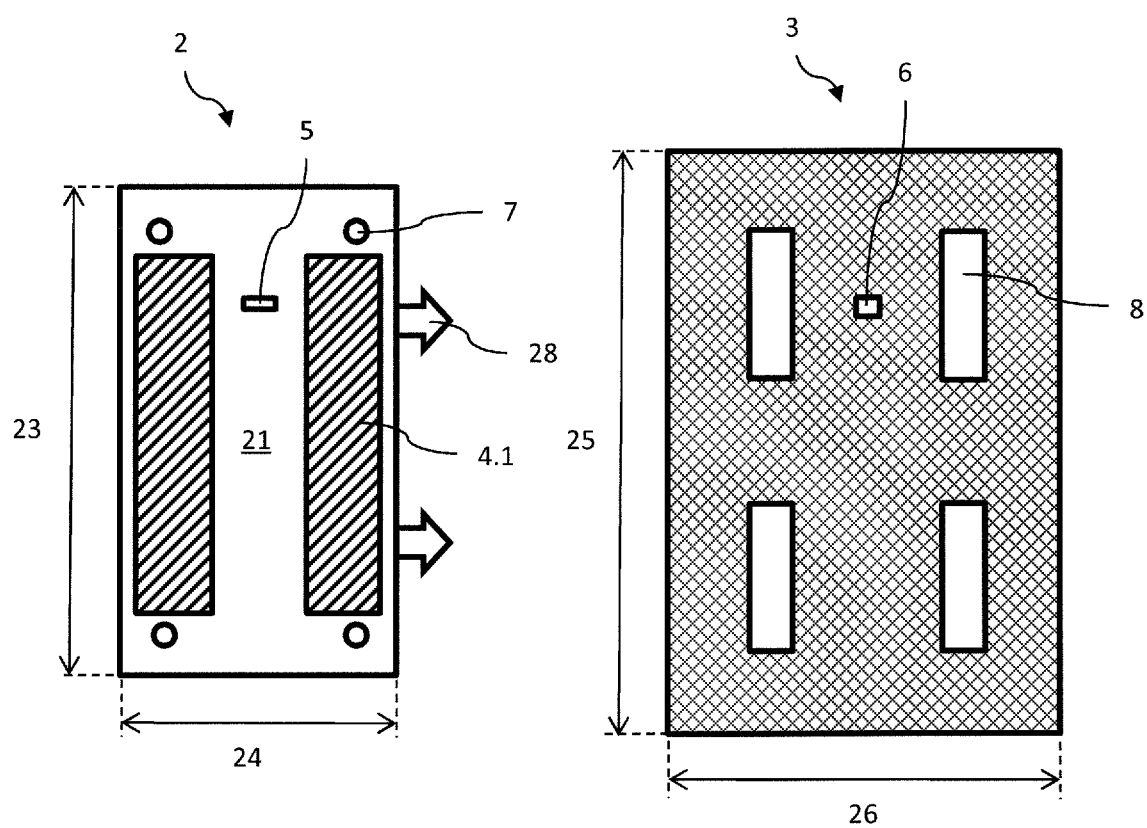
FIG. 5 shows an exemplary illustration of a support and of a reinforcing element.

FIG. 5 illustrates an illustrative support 2 and an illustrative reinforcing element 3 in plan view. The first surface 21 of the support 2 is visible in this illustration. A first connecting element 5, a plurality of spacers 7 and the first adhesive 4.1 are arranged on this first surface 21 of the support 2. Also arranged on the support 2 are fastening elements 28, with the aid of which the support 2 can be pre-fixed in the structural element before the adhesive 4 connects the support 2 and the reinforcing element 3 to the structural element.

The reinforcing element 3 has a second connecting element 6 for connection to the first connecting element 5 of the support 2. Moreover, the reinforcing element 3 has apertures 8, through which the adhesive 4 can flow.

Also illustrated respectively in FIG. 5 are a length 23 of the support 2, a length 25 of the reinforcing element 3, a width 24 of the support 2 and a width 26 of the reinforcing element 3.

LIST OF REFERENCE SIGNS

1 System
2 Support
3 Reinforcing element
4 Adhesive
4.1 First adhesive
4.2 Second adhesive
4.3 Third adhesive
5 First connecting element
6 Second connecting element
7 Spacer
8 Aperture
10 Body
11 A-pillar
12 B-pillar
13 C-pillar
14 Roof frame
16 Reinforcing device
18 First wall
19 Second wall
21 First surface
22 Second surface
23 Length of the support
24 Width of the support
25 Length of the reinforcing element
26 Width of the reinforcing element
28 Fastening element

The invention claimed is:

1. A reinforcing device for reinforcing a structural element in a motor vehicle, the reinforcing device comprising:
a support having a first surface for orientation towards a first wall of the structural element and a second surface for orientation towards a second wall of the structural element;
a reinforcing element for arrangement between the support and the first wall of the structural element; and
an adhesive for connecting the support to the reinforcing element and for connecting the support and the reinforcing element to the structural element,
wherein the support has a first connecting element and the reinforcing element has a second connecting element, and the first and second connecting elements mate with each other to mechanically connect the support to the reinforcing element.

2. The reinforcing device according to claim 1, wherein a first adhesive is arranged on the first surface of the support and/or on the reinforcing element, and wherein a second adhesive is arranged on the second surface of the support.

3. The reinforcing device according to claim 1, wherein a third adhesive is arranged on the reinforcing element.

4. The reinforcing device according to claim 1, wherein the reinforcing element has at least one aperture.

5. The reinforcing device according to claim 4, wherein the at least one aperture makes up between 10% and 50% of a total area of the reinforcing element.

6. The reinforcing device according to claim 1, wherein the reinforcing element comprises metal, plastic, fibre-reinforced plastic or combinations thereof, and/or wherein the support comprises plastic or fibre-reinforced plastic, and/or wherein the support has ribs for reinforcement.

7. The reinforcing device according to claim 1, wherein the adhesive comprises a non-expandable or expandable adhesive and/or wherein the adhesive comprises a curable adhesive.

8. The reinforcing device according to claim 1, wherein a length of the reinforcing element is between 50% and 200% of a length of the support, and/or wherein a width of the reinforcing element is between 50% and 200% of a width of the support.

9. The reinforcing device according to claim 1, wherein the first connecting element is a clip.

10. A method for reinforcing a structural element in a motor vehicle, the method comprising the following steps:
supplying a support having a first surface and a second surface;
supplying a reinforcing element;
mechanically connecting the support to the reinforcing element with mechanical connecting elements;
after mechanically connecting the support to the reinforcing element, arranging the support and the reinforcing element in the structural element, such that the first surface faces a first wall of the structural element and the second surface faces a second wall of the structural element, and such that the reinforcing element is arranged between the support and the first wall of the structural element; and
connecting the support and the reinforcing element to the structural element with adhesive.

11. A system of a reinforced structural element in a motor vehicle, the system comprising:
a structural element having at least one first wall and one second wall;
a reinforcing device arranged in the structural element, comprising:
a support having a first surface and a second surface, wherein the first surface faces the first wall of the structural element and wherein the second surface faces the second wall of the structural element;
a reinforcing element, which is arranged between the support and the first wall of the structural element; and
an adhesive, which connects the support to the reinforcing element and which connects the support and the reinforcing element to the structural element,
wherein the support has a first connecting element and the reinforcing element has a second connecting element, and the first and second connecting elements mate with each other to mechanically connect the support to the reinforcing element.

12. The system according to claim 11, wherein the reinforcing device is arranged in a region of a node of a body of the motor vehicle.

13. The system according to claim 11, wherein the first connecting element is a clip.

14. The method according to claim 10, wherein the mechanical connecting elements include a (i) clip; and (ii) an element that mates with the clip.

15. The method according to claim 10, comprising the following additional step: expanding the adhesive and/or curing the adhesive.

* * * * *